Figure 1:
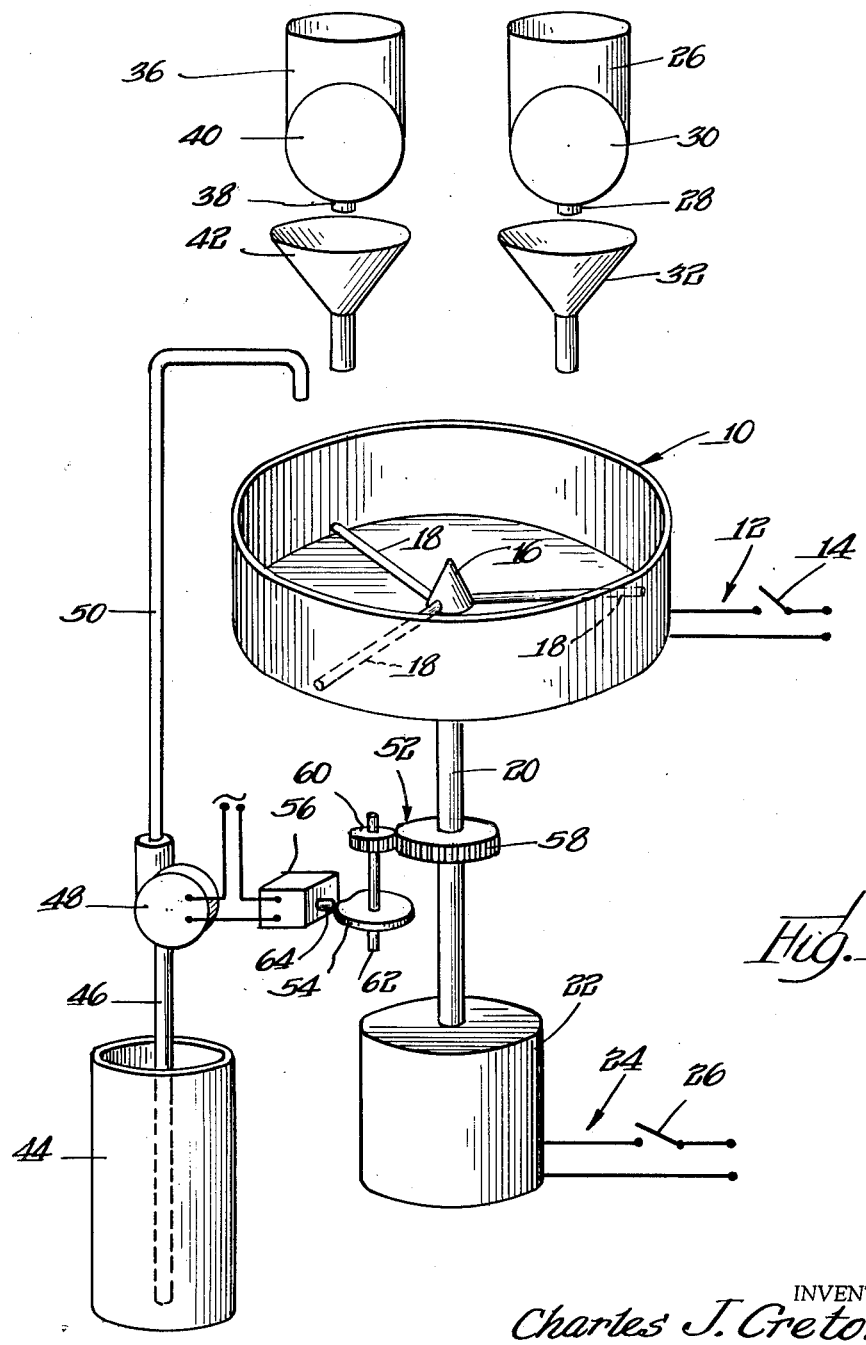

July 14, 1964

C. J. CRETORS 3,140,952

METHOD OF DISPERSING SALT IN A POPCORN SLURRY

Filed Nov. 29, 1961

INVENTOR.
Charles J. Cretors
BY
Olson, Trexler,
Wolters & Bushnell attys.

United States Patent Office 3,140,952
Patented July 14, 1964

3,140,952
METHOD OF DISPERSING SALT IN A POPCORN SLURRY
Charles J. Cretors, Highland Park, Ill., assignor to C. Cretors & Co., Chicago, Ill., a corporation of Illinois
Filed Nov. 29, 1961, Ser. No. 155,757
2 Claims. (Cl. 99—81)

This invention relates generally to the art of popping popcorn for commercial purposes and more particularly to methods of dispersing popcorn-seasoning salt in a slurry comprising unpopped popcorn and cooking oil and further to apparatus for making the salted slurry.

This application is a continuation-in-part of application Serial No. 690,911, filed October 18, 1957, and entitled "Salt Tablet," now abandoned.

Commercial popcorn-making machines ordinarily include a popping chamber and a device for dispensing measured quantities of popcorn, fat or oil and salt or other seasoning to the popping chamber; and because popcorn-seasoning salt is inherently finely divided in form, considerable difficulty has been heretofore encountered with dispensing the salt, the finely divided salt tending to absorb moisture from the air and cause corrosion in the salt duct and its orifice. This corrosion has been found to interfere with proper functioning of the dispensing device with resultant improper seasoning of the popped corn.

In compliance with the present invention, popcorn-seasoning salt is formed into pellets or tablets to permit accurate dispensing and therefore accurate seasoning of the popped product; however, tablets made of salt alone have been found to disintegrate much too slowly to achieve uniform dispersion of the salt before the corn begins to pop.

Therefore, a general object of the present invention is to provide an improved method of dispersing popcorn-seasoning salt in a slurry comprising unpopped popcorn and cooking oil.

Another object of the invention is to provide a method of rapidly dispersing popcorn-seasoning salt in such a slurry.

A further object of the invention is to provide novel apparatus for making the salted slurry.

Additional objects and features of the invention pertain to the particular procedures, materials and arrangements whereby the above objects are attained.

According to the present invention, popcorn-seasoning salt is dispersed in a slurry of unpopped popcorn and cooking oil by mixing the salt with an edible, lipophilic material and by adding portions of the resultant mixture to the slurry. Combining of the popcorn-seasoning salt, in this manner, with a material which is miscible in the cooking oil has been found to facilitate rapid dispersion of the salt from a discrete portion of the mixture throughout the slurry of corn and oil. In addition, uniform mixing of the lipophilic material and the salt has been found to enhance dispersion of the salt; and satisfactory uniformity in the distribution of the lipophilic material throughout the popcorn-seasoning salt has been achieved by employing a lipophilic material in finely divided form. Provision of the lipophilic material in finely divided form is advantageously achieved by subjecting the material to spray cooling.

Since the slurry of corn and oil is necessarily heated in order to pop the corn, it has proved of further advantage to select the lipophilic material to possess a melting point somewhat below the cooking temperature of the slurry and somewhat above the storage temperatures to which the popcorn-seasoning salt is ordinarily exposed. Specifically, the lipophilic material is selected to possess a melting point of at least about 120° F. and preferably about 140° F.

In specific accord with the present invention, popcorn-seasoning salt (essentially 100 mesh or less in particle size) is formed into pellets or tablets containing about 95 to 90% or less salt and, by way of a lipophilic material, about 5 to 10% or more of a saturated higher fatty acid glyceride containing a saturated fatty acid having at least fourteen and preferably sixteen or more carbon atoms. The lipophilic material, in addition to acting as a dispersing agent, serves to bind the salt together whereby to permit tableting; and because the popped popcorn is intended for human consumption, the lipophilic material must be edible or, at least, non-toxic. Therefore, the lipophilic material may take the form of a monoglyceride, a diglyceride or a triglyceride higher fatty acid ester. Specific examples of such materials include glyceryl mono-, di- and tri-stearates in addition to completely hydrogenated cottonseed, peanut and olive oils.

The lipophilic materials suitable for use in the instant invention also include the commonly available vegetable oils and butters, other than some fats of the coconut oil group, and the animal fats which have been hydrogenated and/or fractionated sufficiently to possess a melting point of about 120° F. or more.

When the mixture of popcorn-seasoning salt and lipophilic material is to be used in the form of discrete portions of the mixture, conventional tableting or pelletizing procedures and apparatus are employed; and advantageously, the resultant tablets or pellets are fashioned in a somewhat rounded shape in order to preclude chipping off of the edges. With tablets or pellets provided in a shape which tends to prevent this chipping, objectionable accumulations of salt powder in the dispensing mechanism and non-uniform seasoning of the popcorn product are substantially eliminated.

By way of specific example, sodium chloride having the following screen analysis has been employed in the practice of the present invention:

| | Percent |
|---|---|
| Number 65 Tyler Screen | 0.5 |
| Number 80 Tyler Screen | 1.0 |
| Number 100 Tyler Screen | 16.5 |
| Number 115 Tyler Screen | 18.0 |
| Number 150 Tyler Screen | 16.0 |
| Number 200 Tyler Screen | 19.0 |
| Thru 200 Tyler Screen | 29.0 |

Nine pounds of the above salt was tableted with one pound of glyceryl monostearate, provided in finely divided form; and suitable quantities of the resultant tablets, when dispensed into a slurry of unpopped popcorn and cooking oil, dissolved readily under conditions of heating and agitation to disperse the popcorn-seasoning salt uniformly throughout the slurry. Moreover, these tablets did not tend to absorb moisture nor cause corrosion in the dispensing duct and orifice of the apparatus of the invention.

In order that the apparatus aspects of the present invention may be more fully understood, a single embodiment thereof is shown in the accompanying drawing wherein FIG. 1 is a schematic diagram of apparatus for making an accurately proportioned slurry of unpopped popcorn and cooking oil, which slurry has popcorn-seasoning salt uniformly dispersed therein.

Referring now in detail to the drawing, a popcorn processing vessel 10 is seen fashioned in the form of a deep, cylindrical pan. Since the vessel 10 is intended for popping of the corn as well as for mixing of the corn, oil and salt, heating means, not shown, are advantageously mounted in thermal contact with the floor and/or sides of the vessel 10. Electrical heating means are particularly useful; and when such heating means are employed, electrical energy is delivered into the vicinity of vessel 10 by conductors 12 and a suitably operated switch 14.

A conical formation 16 is raised from the center of the floor of vessel 10 to act as a guide for the materials being introduced and mixed in the vessel. Since mixing of the popcorn slurry is advantageously performed under conditions of agitation, a suitable number of rotatable blades 18 are affixed to a shaft 20 to radiate therefrom closely adjacent to the floor of the vessel 10. The blades 18 may be mounted to the shaft 20 by means of the formation 16, in which case the formation is made rotatable relative to the vessel 10; or the blades 18 may be rotated beneath the lower edge of the formation 16, in which latter case the formation 16 is mounted to be rigid with respect to the vessel 10 as by being suspended from the vessel or affixed to a shaft concentric with the shaft 20.

An electric drive motor 22 is supplied with current through conductors 24 and a switch 26 in order to provide motive force to the shaft 20; and advantageously, the motor 22 is combined with a speed reducer, not shown, for providing the proper, low speed rotation desired for operation of the blades 18.

Salt tablets or pellets produced in accordance with the present invention are stored in a supply hopper 26 which communicates with a discharge orifice 28 through a rotary measuring device 30. The measuring device 30 is arranged to separate a predetermined number of the tablets from the mass contained in hopper 26, as by momentarily aligning a movable orifice with respect to a stationary orifice open to the interior of hopper 26. The tablets delivered through orifice 28 pass under the influence of gravity to a guide funnel 32 which directs the tablets into the vessel 10.

In similar fashion, unpopped popcorn is stored in a supply hopper 36 which communicates with a discharge orifice 38 through a rotary measuring device 40. The elements 36, 38 and 40 are similar to elements 26, 28 and 30, the principal difference being in the size of the alignable orifices, the alignable orifices in the elements 36 and 40 being larger than the corresponding orifices in elements 30 and 26 in order to deliver an amount of the unpopped popcorn which will be suitably seasoned by the selected number of salt tablets. A guide funnel 42 receives the corn delivered through orifice 38 and passes the corn into the vessel 10.

The rotary devices 30 and 40 are advantageously operated from the shaft 20 in accordance with conventional means so as to coordinate the delivery of unpopped popcorn and salt tablets to occur substantially simultaneously. It is also desirable to deliver the necessary cooking oil to the vessel 10 substantially simultaneously with or slightly before the introduction of the unpopped popcorn and salt. Therefore and in accordance with a feature of the present invention, a quantity of the cooking oil is stored in a container 44 situated underlying the vessel 10; and the oil is pumped from container 44 through a conduit 46 by a gear pump unit 48, the pump of unit 48 delivering oil to the vessel 10 through a conduit 50.

As will be recognized, delivery of a proper, predetermined volume of the cooking oil to the vessel 10 is necessary to the development of an accurately proportional slurry of unpopped popcorn and cooking oil, an accurately proportioned slurry maximizing the efficiency of the popping operation and ensuring acceptable flavoring of the finished product. In specific accordance with the present invention, the gear pump unit 48 is operated from the shaft 20 by means of speed reducing gearing 52, a timing cam 54 and a microswitch 56. Specifically, a spur gear 58 is affixed to shaft 20 to mesh with a pinion gear 60 which is mounted on a separate shaft 62. Cam 54 is also affixed to shaft 52 to be situated in coactive relationship with an operating pin 64 of microswitch 56.

The cam 54 is particularly arranged to energize the motor of gear pump unit 48 for a short interval at the beginning of each popcorn-making cycle. Moreover, the gear pump unit 48 is specifically operated at a speed which is in substantial excess of its rated speed of operation in order to secure substantially uniform volume delivery from the pump. Operating time for the motor of pump 48 is on the order of one second whereas its actual speed of operation is on the order of eight times its rated speed. In addition, it is to be recognized that pump unit 48 is capable of delivering substantially uniform volume of the cooking oil only when no substantial differences in the viscosity of the oil are encountered, as might be encountered from marked changes in the temperature of the oil in the container 44.

When the unpopped popcorn, the cooking oil and the salt tablets have been delivered into the vessel 10, agitation of the ingredients by means of rotating the blades 18 mixes the unpopped popcorn and the oil into a slurry; and as the lipophilic material which has been previously combined with the salt in the tablets interacts with the cooking oil and melts under the influence of the heat applied to the vessel 10, the individual salt particles are quickly released to the slurry to be uniformly dispersed therein. Upon further exposure of the salted slurry to heat in the vessel 10, the corn begins to pop and spill over the edge of the vessel 10 to be collected in a suitable container or chute, not shown.

The specific examples herein shown and described should be considered as illustrative only. Various changes may occur to those skilled in the art; and such changes are to be understood as forming a part of this invention insofar as they fall within the true spirit and scope of the appended claims.

The invention is claimed as follows:

1. A method of dispersing popcorn-seasoning salt in a slurry comprising unpopped popcorn and cooking oil, said method including the steps of: mixing said salt with an edible, higher fatty acid glyceride to produce a uniform mixture; tableting said mixture to form discrete pellets; measuring a quantity of said pellets and adding them to said slurry to disperse said salt therein.

2. A method of dispersing salt in a slurry comprising unpopped popcorn and cooking oil, said method including the steps of: mixing said salt with an edible, higher fatty acid glyceride to produce a uniform mixture; tableting said mixture to form discrete pellets; measuring a quantity of said pellets; adding the measured quantity of pellets to said slurry; and agitating said slurry to disperse said salt therein.

References Cited in the file of this patent
UNITED STATES PATENTS

| | | |
|---|---|---|
| 2,175,083 | Keil | Oct. 3, 1939 |
| 2,518,247 | Nairn | Aug. 8, 1950 |
| 2,702,246 | Kinsella | Feb. 15, 1955 |
| 2,939,379 | Schmitt | June 7, 1960 |
| 2,972,292 | Waas et al. | Feb. 21, 1961 |